United States Patent [19]

Fondronnier et al.

[11] Patent Number: 4,559,987
[45] Date of Patent: Dec. 24, 1985

[54] VENEER LATHE

[75] Inventors: Jacques Fondronnier, Creteil; Jean Guillerm, Nevez; Michel Comte, Ermont, all of France

[73] Assignee: Centre Technique du Bois et de L'Ambeublement, Paris, France

[21] Appl. No.: 607,627

[22] Filed: May 7, 1984

[30] Foreign Application Priority Data

May 9, 1983 [FR] France ................................ 83 07689

[51] Int. Cl.$^4$ .............................................. B27L 5/02
[52] U.S. Cl. ..................................... 144/213; 144/365
[58] Field of Search .................. 144/209 R, 213, 365; 82/38 R, 39, 45

[56] References Cited

U.S. PATENT DOCUMENTS

| 351,518 | 6/1970 | Nagaoka | 144/209 R |
| 3,040,791 | 6/1962 | Fauchon | 144/213 A U |
| 3,372,721 | 3/1968 | James et al. | 144/209 R |
| 3,421,560 | 1/1969 | Springate | 144/209 R |
| 3,473,584 | 10/1969 | Reed | |
| 4,335,764 | 6/1982 | Schmidt | 144/209 R |
| 4,380,259 | 4/1983 | Brooichyser et al. | 144/213 |
| 4,454,900 | 6/1984 | Hayes | 144/209 R |
| 4,462,442 | 7/1984 | Pointer | 144/213 |

FOREIGN PATENT DOCUMENTS

| 56287 | 3/1891 | Fed. Rep. of Germany . |
| 2601433 | 12/1976 | Fed. Rep. of Germany . |
| 2542959 | 3/1977 | Fed. Rep. of Germany . |
| 2147438 | 3/1973 | France . |
| 330577 | 7/1958 | Switzerland . |
| 558430 | 1/1944 | United Kingdom . |

Primary Examiner—W. D. Bray
Attorney, Agent, or Firm—Brumbaugh, Graves, Donohue & Raymond

[57] ABSTRACT

In a veneer lathe comprising a cutting slide and an anti-buckling device which are pressed by actuating means against a workpiece held between said lathe's rotating end chucks and wherein said cutting slide and anti-buckling device are guided relative to the stationary frame of said lathe along converging working planes forming an upwardly opening obtuse angle of substantially 120°, the improvement wherein said working planes are bisected by a plane substantially vertical to and intersecting the rotational axis of the rotating workpiece.

7 Claims, 4 Drawing Figures

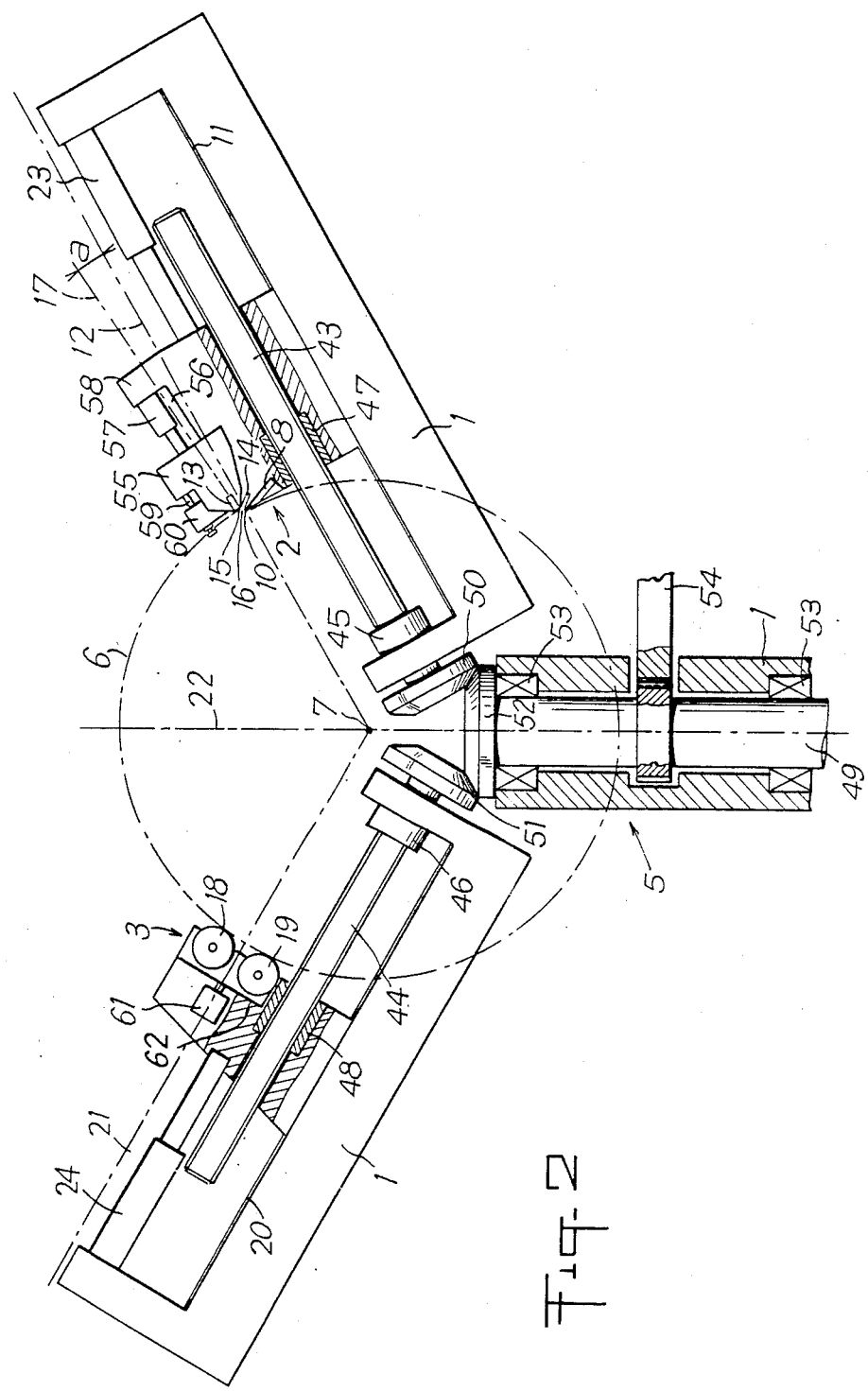

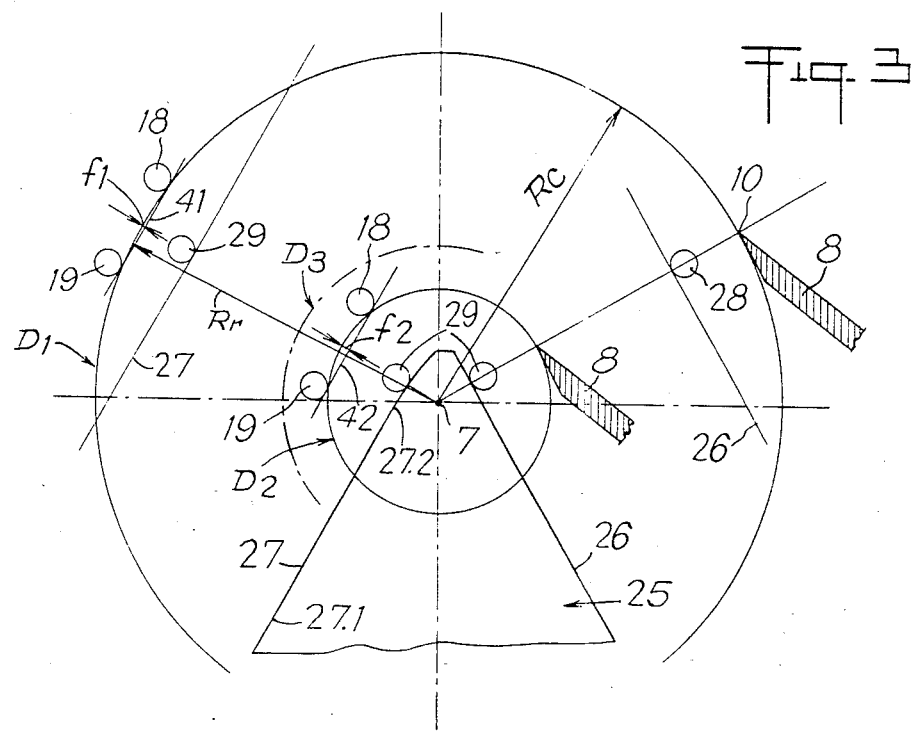
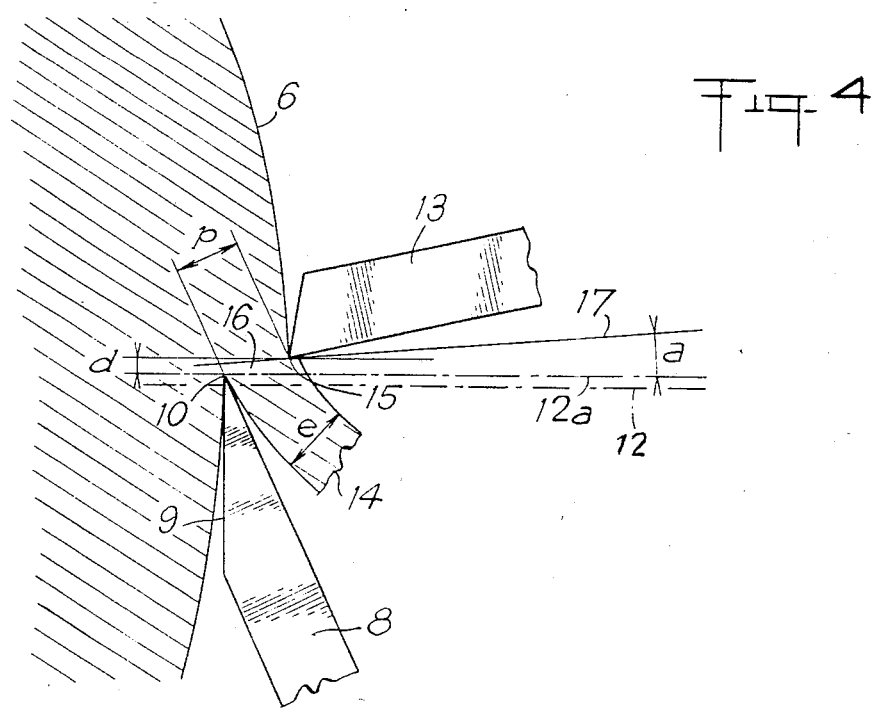

VENEER LATHE

Wood peeling machines, or veneer lathes, are engine lathes with a cross slide working the full length of a wood workpiece or peeler log to be peeled for veneer.

Slide feed is synchronized with the rotation of the lathe spindles which rotatably drive the log.

Accordingly, for each exact 360° rotation, the cross slide moves forward by an amount always equal to the thickness "e" of the peeled veneer. This is an expression of the Spiral of Archimedes with an infinite number of centers.

A modern veneer lathe brings into play forces which are all the greater for the smaller diameter of the logs processed and the faster turning speeds crucial in boosting productivity.

The reactions to the cutting and compressive force cause deformations to occur which are detrimental to the quality of the peeled veneer. Such "buckling-type" deformations increase to the extent that the rotational speed is increased and the diameter of the peeler logs is decreased.

Studies conducted by various veneer-making specialists have shown that the mean reaction of greatest deformation always appears on the side of the log opposite the side worked by the lathe knife and follows an ascending direction, at approximately a 30° angle to the vertical plane passing through the axis of the lathe centers, assuming the cutting edge of said knife is itself in a horizontal plane.

All of the lathe manufacturers have at one time or another proposed so-called "anti-buckling" devices having an incidence directly opposed to the distorting reaction in order to counteract said reaction.

Such devices are commonly offered as optional accessories.

It now appears that the anti-buckling device should be systematically provided with all veneer lathes and should be treated as an indispensable and essential component of the machine.

Most prior art anti-buckling devices are operationally inaccurate due to the fact that they must continuously oppose fleeting movements, occurring at frequencies which are both inconsistent and very fast, involving continuously varying directions and amplitudes.

Said movements result from the heterogeneity of the material (wood) being processed and from the sudden stresses imparted by this heterogeneity to the components of the machine. Thus, the toolholder slide is subjected to a greater force from the wood when the knife penetrates denser, harder areas of the log, or works against the grain or through knots.

Added to this major variable is the phenomenon of the wood's relative compression between the knife and the compression bar.

Exertion of compression is inseperable from the production of quality peeled veneer. This requirement contributes significantly to the large variation of forces which stress many of the machine's mechanical parts, frequently causing often violent impacts which produce deep and always irregular wear.

The compression is determined by adjustment of the clearance between the knife and the compression bar, said clearance being less than the thickness of the wood shaving.

Knowing that the compression factor can routinely reach values on the order of 15 to 20%, it is easy to imagine the consequences ensuing from the very localized and extremely variable hardnesses encountered within a given wooden workpiece.

The soft, more easily compressed portions of the wood are handled without undue stress, while the less easily compressed countergrain portions, as well as those containing inclined fibers and knots, more or less violently impact the knife and compression bar and buffet the mechanical parts on which the clearances are set.

By accident of nature, such inconsistencies are distributed quite unpredictably throughout the wooden mass, such that blows are delivered at different times to the right, or to the left, throughout the length of the cutting tools, reactively entraining severe blows against the machine spindles, the machine's lead screws and their slide-driving nuts, the slideways and the backward stops used to set the required mean clearance.

The unavoidable log trueing or "billeting" operations required to be performed on the logs before continuous peeling can begin moreover have a very adverse effect on established settings.

The billeting operations involve a series of highly localized impacts the incidences whereof are multiplied by the considerable thicknesses of shavings removed at this time.

In fact the billeting process is the chosen time for observing the degree of play in mechanical parts and gauging the extent of impairment of veneer lathes.

It is the object of the invention disclosed herein to overcome these disadvantages and to provide a new machine design, in terms of layout and structure, putting gravity to work to enable:

constant, automatic taking up of operationally induced mechanical play;

strict conformance to the spiral path followed by the tool's cutting edge in the peeler log, due to a positive pressure of the top slide (tool holder), driven by a force partly stemming from the pull of gravity and greater than the maximum reactions to the cutting and compressive force;

greater accuracy of machine movements and of veneer dimensions;

significant reduction of the above-mentioned reactions by compensating these with the opposing considerable weight component of the tool-carrying top slide;

considerable reduction in wear of machine parts;

and a major improvement in the ruggedness and reliability of this type of machine.

Like the prior art veneer lathes, the improved machine according to the invention comprises a working slide and an antibuckling device, both of which are pressed by actuating means against the peeler log, said log being secured between the jaws of the rotating end chucks, said working slide and said anti-buckling device being guided in their transverse motion relative to the stationary frame of the machine along convergent planes forming between them an obtuse angle substantially equal to 120°, opening upwardly.

To satisfy the above-mentioned goal, and in accordance with the invention, the plane bisecting the working planes of the tool slide and the antibuckling device and intersecting the rotational axis of the spindles is substantially vertical.

Specifically, the working and anti-buckling slides are guided along slideways in the stationary frame and pushed toward the workpiece and down against stopping means by permanently acting jacks, said stops being synchronously moved by an actuating means, such that the slides move in substantially equal steps toward the previously-mentioned rotational axis.

In the preferred embodiment of the invention said stops consist of two triangular cams mounted at the ends of said slides, said cams having symmetrical arresting sides extending perpendicularly to the fixed guideways of said moving slides, said arresting sides being movable in a substantially vertical direction in relation with the previously-mentioned driving means, said means being preferrably of the lead screw and nut type, said arresting sides of the cams cooperating with cam follower rollers fitted to the facing slides.

In another embodiment of the invention said arresting means or stops consist of two lead screws mounted at the two ends of both of said slides and extending in the directions of guiding of said slides along their fixed slideways, said stops being mounted rotatably but fixedly in translation relative to the stationary frame and kinematically linked, for synchronous rotation, to the previously-mentioned actuating device, said latter device being preferrably of the rotating shaft and miter gear type, the lead screws cooperating with movable stop nuts attached to said slides.

In both embodiments, the tool-holder slide directly supports a knife and indirectly supports a compression bar holding slide, the latter being supported via slideways inclined at an angle of substantially 6° with respect to the slideways of said knife slide and converging toward said latter slideways in the direction of said rotational axis, said compression bar slide being pushed by at least one actuating jack into contact, via an adjustable stop, with an arresting means on the knife holding slide, said stop and arresting means pair being located on the rotational axis side.

Other features and advantages of the invention will become apparent from the following detailed description of the two embodiments just mentioned, with reference to the appended drawings of non-limitative embodiments, in which:

FIG. 2 is a view taken in the same way as that of FIG. 1, of a second embodiment of the invention;

FIG. 3 is a diagram illustrating a modification of the contour of the triangular cam used in the embodiment shown in FIG. 1;

FIG. 4 is a diagram illustrating the principle applied in the special mounting of the compression bar according to the invention.

Figure 1:
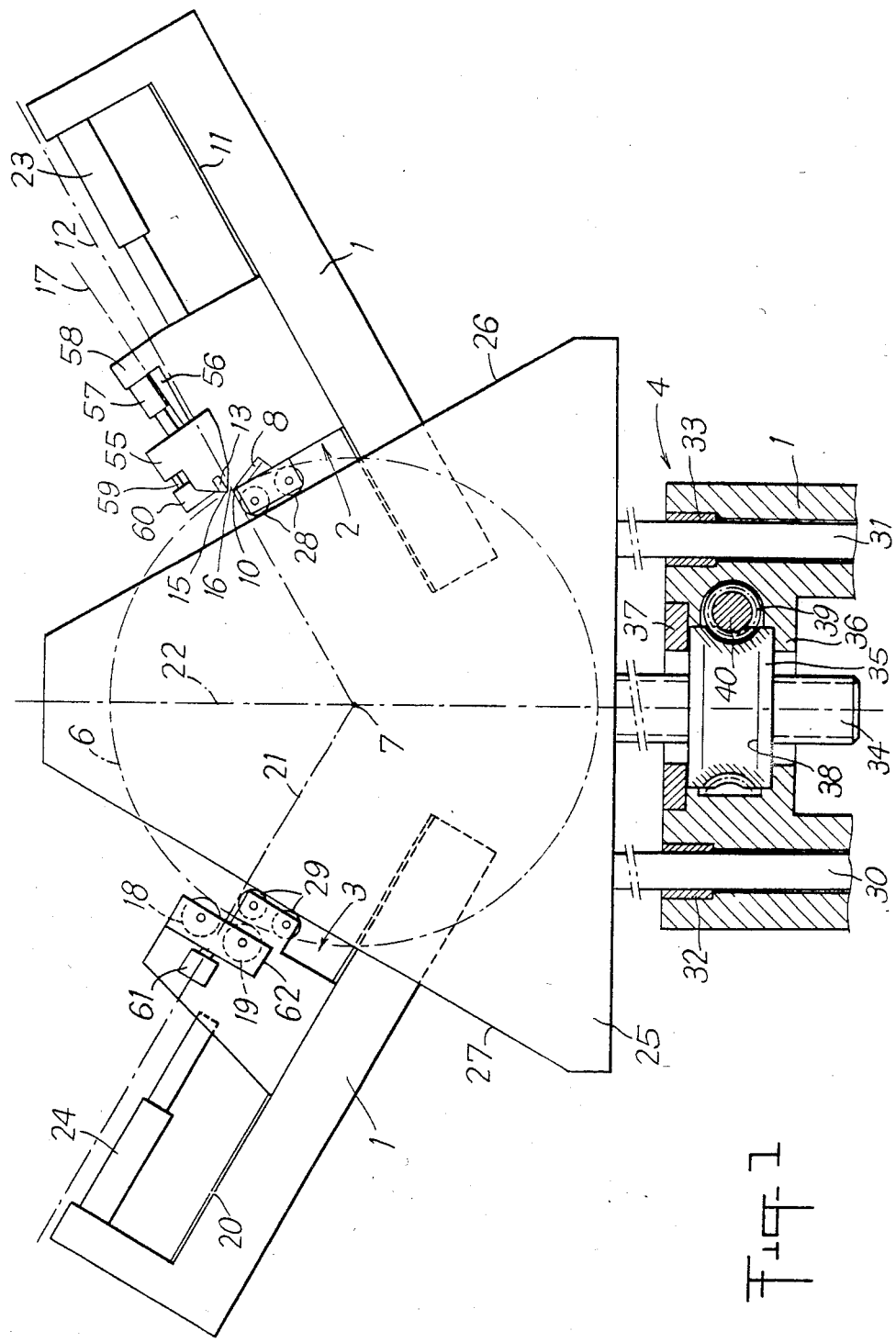
FIG. 1 is a cross-sectional elevation showing a first embodiment of the improvements made by the invention to a veneer lathe.

Regardless of the embodiment selected, the veneer lathe, as improved in accordance with the invention, comprises a stationary frame 1 whereof only the parts supporting the working or cutting slide 2, the anti-buckling slide 3 and the feed control means 4 or 5 of said slides are specifically shown. The other parts of the frame and the remaining mechanical parts ensuring correct operation of the veneer process have been left out of the drawing to allow the improvements according to the invention to be more readily understood. In particular, the headstock and tailstock chucks used to hold and rotatively drive a peeler log 6 about a rotational axis 7 have been left out. The slides 2 and 3 extend the full length of the space between the chucks or centers to enable peeling logs of the greatest possible length and the two control means 4 (FIG. 1) or 5 (FIG. 2) are located at the ends of the slides, outside of the working range of the peeling means.

The cutting slide is equipped, using any suitable adjusting and fastening means, with a peeling knife 8 (FIGS. 1 and 2) whose log contacting face 9 (FIG. 4) is tangent to the log 6 at the cutting edge 10. Slide 2 is guided along a fixed slideway 11 of the frame and moves crosswise to the rotational axis such that the cutting edge 10 moves in a plane 12a 2 mm higher than the plane intersecting said rotational axis 7 and parallel to said last plane. This superelevation of the cutting edge makes it possible to obtain a continuous and automatic adjustment of the clearance angle on the order of 2° between diameters of 800 mm and 100 mm. A compression bar 13 is also mounted on said slide 2 to compress the wood at an entirely determined rate and within a well-determined area around the cutting edge. Accordingly, the peeled wood, such as veneer 14, has a thickness "e", whereas the compressing edge 15 of compression bar 13 allows a clearance 16 over cutting edge 10 of width "p", amounting to between 80% and 85% of the thickness "e" of the veneer, and said compressing edge 15 must be located on a higher level than said cutting edge 10 according to a distance "d" perpendicular to plane 12a and depending on thickness "e". Experience has shown that if said thickness "e" is 1, 2, 3, 4, 5, 6 mm, then distance "d" must be 5/10, 6/10, 7/10, 8/10, 9/10 and 10/10 respectively. Consequently, to apply this experimental rule, one need only move the compression bar edge 15 when adjusting veneer thickness in a plane 17 forming an angle "a" (FIG. 4) with the previously mentioned plane 12—substantially a 6° angle.

The anti-buckling slide 3 supports two equispaced rows of pressing rollers 18 and 19 which are kept in contact with the peeler log 6. This slide is guided along a fixed slideway 20 of the frame and is crossfed so that the its rollers' contact lines move parallel to a symmetrical plane 21 intersecting rotational axis 7.

The plane 12 generated by cutting edge 10 in its translation is parallel to the guidance plane of slide 2 in translation along slideway 11. Similarly, the rollers' 18, 19 plane of symmetry in translation is parallel to the guidance plane of slide 3 along slideway 20. Said two planes 12 and 21 intersect along rotational axis 7, forming an upwardly opening dihedral angle of about 120°.

In accordance with the invention, the plane 22 bisecting said dihedral angle is substantially vertical such that slideways 11 and 20 slope downward toward the peeler log and slides 2 and 3, by virtue of their own, relatively great weight, apply the knife 8 and the compression bar 13, and the antibuckling pressure rollers 18, 19 respectively to the peeler log 6.

Said slides 2 and 3 are pushed toward said peeler log 6 by permanently acting jacks 23 and 24 (FIGS. 1 and 2) which may be either hydraulic or pneumatic jacks; the jacks being designed to make said slides 2 and 3 cooperate with synchronously moving arresting means constituting the previously-mentioned feed control devices 4 or 5.

Referring now to FIG. 1, the feed mechanism 4 of the machine according to the first embodiment consists of a triangular cam 25 mounted to the ends of slides 2 and 3, the sloping cam sides 26, 27 thereof extending perpendicularly to the slideways of said slides and therefore to the planes 12 and 21 of movement of the cutting tools 8, 13 and of the anti-buckling rollers 18, 19. Consequently, said arresting sides 26 and 27 of the triangular cam are symmetrical with respect to the vertical plane 22 intersecting rotational axis 7 and make a 60° angle between them in the given example.

The arresting sides (stops) 26 and 27 cooperate with follower rollers 28 and 29 respectively, mounted to slides 2 and 3 in line with jacks 23 and 24.

Each of the end cams 25 is vertically driven (driven parallel to plane 22) so that its arresting sides 26 and 27, by maintaining followers 28 and 29 more or less apart from rotational axis 7, respectively determine the radius of action of knife 8 as well as of compression bar 13 of slide 2, and of the pressing rollers 18 and 19 of slide 3. In this respect, it should be emphasized that this cam set very accurately determines the peeling spiral, since the geometrical position of the slides 2 and 3 is strictly defined and unaffected by the inconsistencies of the wooden workpiece. In fact, the sum of the forces of the jacks 23, 24 and of the same-direction weight component of slides 2 and 3 is greater than the maximum reacting thrust of the wood on the latter, such that rollers 28 and 29 remain applied to each end cam 25 irrespective of said previously-mentioned inconsistencies, and said slides can move backwards or forwards only in response to the strict and permanent control of said cams.

Each cam 25 is vertically guided with respect to the stationary frame 1; it can thus be solidly attached to two columns 30, 31 able to slide in sleeves 32, 33; each cam 25 moreover is attached to a vertical lead screw 34 which cooperates with an actuating nut 35, said nut being itself rotatably but otherwise fixedly mounted in frame 1, thanks for example to a recess 36 and a collar insert 37. The two nuts 35 of the two end cams 25 are driven in synchronous rotation by any suitable known means, the rise or fall of both said cams having strictly the same instantaneous value. In the example shown, the nuts 35 are provided with peripheral teeth 38 which mesh with a tangent screw 39, the tangent screws 39 of the two end nuts 35 being themselves coupled to a common shaft 40, linked to a rotational driving means such as a geared motor.

The fact that the two pressing rollers 18 and 19 of the anti-buckling slide are spaced apart has an unwanted effect which it is best to correct when working with a small-diameter workpiece 6. Consider that the drawing of FIG. 3 shows that the sagitta fl of the chord 41 tangent to rollers 18 and 19 applied to a large-diameter D1 log is less than the saggita fé of the chord 42 tangent to rollers 18 and 19 applied to a small-diameter log of diameter D2. When the log's diameter is greater than a limit diameter D3, said just-mentioned sagitta changes by only a small amount, and accordingly, the 2-roller follower 29 associated with slide 3 can be considered to apply substantially to a single point and can rest on a straight portion 27.1 of cam 25 side 27, and still keep the pressing rollers 18 and 19 of slide 3 permanently applied to the log 6 as the knife 8 peels said log from a maximum diameter to limit diameter D3. On the other hand, when the log's diameter is less than the limit diameter D3, the above-mentioned sagitta shrinks sufficiently for the pressing rollers 18 and 19 to become imperceptibly removed from the log as the latter is being peeled down from a diameter D3 to a minimum diameter. In order to maintain contact between said rollers 18 and 19, as the motion of slide 3 supporting said rollers is controlled by the end cams 25, the arresting side 27 of said cams is made convex-inwardly curved in its upper portion 27.2, approaching the peak. Said curved length of the slope provides a correcting action compensating the change in the sagitta's value by a very useful, gradually increasing rate of feed of said cam follower 29.

In the second embodiment of the invention, illustrated in FIG. 2, the feed mechanism 5 consists of lead screws 43 and 44, fitted to each of the ends of slides 2 and 3 and extending parallel to fixed slideways 11 and 20 respectively of said slides. Said lead screws are arranged rotatably yet fixed in translation in end stops 45 and 46, working with bearings of frame 1. They cooperate with nuts 47 and 48 which are part of said slides 2 and 3.

These lead screws 43 and 44 constitute true stops, as the jacks 23 and 24 apply the internal threads of nuts 47 and 48, via the action of slides 2 and 3, to the external threads of said screws 43 and 44. Moreover, said screws are in fact mobile stops causing slides 2 and 3 to move crosswise symmetrically and synchronously. Said screws in fact are coupled to a common drive shaft 49 by means of their attached bevel gears 50 and 51, which mesh with a drive pinion 52, on shaft 49. A common rotational drive means, such as a geared motor, connects via control linkages 54 with the two shafts 49, said shafts synchronously driving the two end-mounted pairs of lead screws.

This second embodiment of the feed mechanism 5 operates in the same way as the first with respect to the veneer process.

Whichever embodiment is selected, it is necessary, as previously stated herein, that the compression bar 13 of slide 2 be adjustable in its position on inclined plane 17, as a function of the thickness "e" of veneer 14, in order to be able to accurately determine the width "p" of clearance 16 and the value "d" of the vertical projection of the distance between compressing edge 15 and cutting edge 10.

The invention provides special and specific means of making this adjustment. Compression bar 13 is supported on a slide 55 which slides along a slideway 56 integral to the knife-holding slide 2, said slideway 56 being inclined at an angle of approximately 6° with respect to main slideway 11—the same as the angle formed between the two planes of guidance 12 and 17 being considered here. The bar-holding slide 55 is pushed, by a jack 57 thrusting off from a projecting part 58 of slide 2, against a stop 59. Said just-mentioned stop is located on the side of slide 55 facing peeler log 6 and can be adjusted in relation to another projecting part or arresting means 60 of the main, knife-holding slide 2. Thus, the width "p" of clearance 16 can be set by adjusting stop 59 and the jack or jacks 57 are powerful enough to compel compression bar 13 to strictly and accurately follow its required path, irrespective of the resistance presented by the wood.

Furthermore, it is obvious that the difference between the log radius Rc terminating at the cutting edge of the knife 8 and the log radius Rr terminating at the contact lines of pressing rollers 18 and 19 depends on the thickness of "e" of the peeled veneer. Given that said thickness is essentially variable, but that the arresting side 27 of cams 25 cannot be adjusted relative to said cams, it is worthwhile to provide an adjusting means between slide 3 and pressing rollers 18, 19. Such means could consist for example of shims, or a servomotor 61 or other device, inserted between the slide 3 and a support 62 bearing the two rows of rollers 18 and 19. Accordingly, said support 62 slides a short distance in relation to slide 3 and is provided with high-strength fastening or clamping means.

Regardless of the embodiment which is selected, the essential role of gravity in the static and dynamic balancing of the veneer lathe must be emphasized.

Specifically, gravity is associated with the converging motions of the slides 2 and 3 along slideways 11 and 20, said slideways being substantially symmetrically inclined with respect to the stationary machine frame 1.

The equipped slides 2 and 3 thus thrust against the peeler log 6, bringing to bear the cumulative thrust of two substantially equal and converging forces which further combine with the force of gravity.

These combined forces, together with the mass of the rotating assembly (i.e. the peeler log and lathe spindles) jointly push the whole downward, preventing any play and consequently any untrueing of the rotational axis 7.

It should be understood that various modifications may be made to the invention without departing from the scope and spirit of the invention as described in detail hereinbefore and in the following claims.

What we claim is:

1. An improved veneer lathe comprising a cutting slide and an anti-buckling device pressed by actuating means against a workpiece secured between jaws of rotating end chunks, said cutting slide and said anti-buckling device being guided in a crosswise motion relative to the lathe's stationary frame along convergent planes forming between them an upwardly-opening obtuse angle of substantially 120°, wherein said working planes of the cutting slide and the anti-buckling device are bisected by a plane substantially vertical to and intersecting the rotational axis of said workpiece.

2. A veneer lathe according to claim 1, wherein the cutting slide and the anti-buckling device are guided along slideways in the stationary frame of the lathe and thrust forward toward the workpiece and against stop means, said stop means being synchronously driven by actuating means, such that the slides move in substantially equal steps toward said rotational axis.

3. A veneer lathe according to claim 2, wherein said stop means includes triangular cams arranged at the ends of the said respective slides, said cams having symmetrical arresting sides extending perpendicularly to the guidance planes of said slides along the fixed guideways, said arresting sides being movable in a substantially vertical direction in relation with said actuating means, and said arresting sides of the cams cooperating with cam follower rollers on the facing slides.

4. A veneer lathe according to claim 2, wherein the stop means includes two lead screws mounted at the ends of both of said slides and extending in the directions of guiding of said slides along their fixed slideways, said stops being mounted rotatably but fixedly in translation relative to the stationary frame and kinematically linked, for synchronous rotation, to said actuating device, said lead screws cooperating with movable stop nuts attached to said slides.

5. A veneer lathe according to claim 2, wherein the cutting slide directly supports a knife and indirectly supports a compression bar holding slide, the latter being supported via slideways inclined at an angle of substantially 6° with respect to the slideways of said knife slide and converging toward said latter slideways in the direction of said rotational axis, said compression bar slide being pushed by at least one actuating jack into contact, via an adjustable stop, with an arresting means on the knife holding slide, said stop and arresting means pair being located on the rotational axis side.

6. a veneer lathe according to claim 2, wherein the anti-buckling device supports two equally spaced rows of pressing rollers via an intervening adjusting means enabling the difference between two radiuses of the workpiece, respectively terminating at the cutting edge of the knife and at the contact lines of said pressing rollers, to be adjusted to suit the thickness of the veneer peeled from the workpiece.

7. A veneer lathe according to claim 3, wherein the anti-buckling device is fitted with two rows of pressing rollers and with a follower applied to the conjugate edge of the arresting side of the corresponding end cam, said latter edge being straight up to a point corresponding with a limit diameter of said workpiece and curved inwardly toward the rotational axis of the lathe beyond a point corresponding with a lesser diameter than said limit diameter, so as to compensate for the variation in the length of the sagitta of the chord tangent to the two rollers as the diameter of the log decreases beyond said limit diameter.

* * * * *